United States Patent
Thomas et al.

(10) Patent No.: US 10,940,753 B2
(45) Date of Patent: Mar. 9, 2021

(54) SYSTEMS AND METHODS FOR LOW POWER CONSUMPTION FUEL LEVEL INDICATION

(71) Applicant: Ford Global Technologies, LLC, Dearborn, MI (US)

(72) Inventors: Joseph Thomas, Holt, MI (US); Ross Dykstra Pursifull, Dearborn, MI (US); Michael Uhrich, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 16/001,741

(22) Filed: Jun. 6, 2018

(65) Prior Publication Data

US 2019/0376826 A1 Dec. 12, 2019

(51) Int. Cl.
*B60K 15/03* (2006.01)
*G01F 9/00* (2006.01)
*G01F 23/24* (2006.01)
*G01F 23/30* (2006.01)

(52) U.S. Cl.
CPC ........ *B60K 15/03006* (2013.01); *G01F 9/001* (2013.01); *G01F 23/24* (2013.01); *G01F 23/30* (2013.01); *B60K 2015/03019* (2013.01); *B60K 2015/0319* (2013.01); *B60K 2015/03217* (2013.01)

(58) Field of Classification Search
CPC ......... G01F 9/001; G01F 23/24; G01F 23/30; G01F 25/0061; G01F 25/0069; B60K 15/03006; B60K 2015/03019; B60K 2015/0319; B60K 2015/03217; B60K 2015/03328

USPC ......................................... 73/114.52, 114.54
See application file for complete search history.

(56) References Cited

U.S. PATENT DOCUMENTS

| 5,050,433 A | 9/1991 | Lumetta |
| 5,072,615 A | 12/1991 | Nawrocki |
| 9,546,894 B2 | 1/2017 | Dudar |
| 2009/0056436 A1 | 3/2009 | Miceli et al. |
| 2010/0145638 A1 | 6/2010 | Begin |
| 2011/0196600 A1* | 8/2011 | Henderson ............. G01C 22/00 701/123 |
| 2016/0082832 A1* | 3/2016 | Dudar ................... G01M 3/025 206/459.1 |

FOREIGN PATENT DOCUMENTS

DE 102012001580 A1 8/2013
DE 102013010547 A1 12/2014

* cited by examiner

*Primary Examiner* — Benjamin R Schmitt
(74) *Attorney, Agent, or Firm* — Geoffrey Brumbaugh; McCoy Russell LLP

(57) ABSTRACT

Methods and systems are provided for determining a fuel level of a fuel tank. In one example, a method may include transiently powering a fuel level sensor responsive to a fuel tank refilling event to obtain a fuel level measurement, maintaining the fuel level sensor unpowered after obtaining the fuel level measurement, and, while maintaining the fuel level sensor unpowered, inferring the fuel level based the obtained fuel tank fuel level measurement and an amount of fuel consumed since the obtained fuel level measurement. In this way, electrical power consumption by the fuel level sensor is reduced while a fuel level indication is provided.

9 Claims, 6 Drawing Sheets

SYSTEMS AND METHODS FOR LOW POWER CONSUMPTION FUEL LEVEL INDICATION

FIELD

The present description relates generally to methods and systems for determining a fuel level in a fuel tank.

BACKGROUND/SUMMARY

Systems for accurately determining and indicating an amount of fuel contained within a fuel tank of a vehicle are used for vehicle operation. For example, the fuel amount may be used by a vehicle operator to determine when and where the vehicle should be refueled prior to the fuel tank being emptied. A typical fuel tank includes a dedicated fuel level sensor, such as a floating sensor, to determine the amount of fuel remaining in the fuel tank. However, during some conditions, such as when the vehicle is tilted, the fuel is experiencing sloshing, or the fuel tank is overfilled, or near empty, the fuel level measured by the fuel level sensor may be inaccurate.

Other attempts to address inaccuracies in the fuel level measured by the fuel level sensor include estimating the fuel level instead of measuring the fuel level during conditions in which the fuel level sensor may output an inaccurate measurement. One example approach is shown by Begin in US 2010/0145638. Therein, a fuel measurement system and method is disclosed that includes using a fuel consumption-based technique to determine the fuel level when the fuel system is experiencing dynamic conditions, including tilting, sloshing, and yawing, and using a fuel level sensor to determine the fuel level under all other conditions (e.g., when the dynamic conditions are not present). As an example, the fuel level sensor is used to obtain a first fuel level reading, and in response to an indication that the dynamic conditions are present, the fuel consumption-based technique is used to obtain a second fuel level reading. A fuel gauge is then updated with the second fuel level reading.

However, the inventors herein have recognized potential issues with such systems. As one example, even while the fuel level is determined using the fuel consumption-based technique, the fuel level sensor continues to measure the fuel level. Electrical power consumption from continually powering the fuel level sensor (e.g., maintaining the fuel level sensor on) may reduce vehicle fuel economy. Furthermore, fuel consumption models may give a highly accurate estimation of the fuel level if the fuel level measurement from which the fuel consumption is subtracted is highly accurate, making continual and/or frequent measurements via the fuel level sensor unnecessary during non-dynamic conditions.

In one example, the issues described above may be addressed by a method, comprising: transiently powering a fuel level sensor responsive to a fuel tank refilling event; maintaining the fuel level sensor unpowered after the transiently powering; and, while the fuel level sensor is unpowered, inferring a fuel tank fuel level based on an output of the fuel level sensor during the transiently powering and an amount of fuel consumed during the maintaining the fuel level sensor unpowered. In this way, vehicle electrical power consumption may be reduced.

As one example, transiently powering the fuel level sensor may include supplying a pulse of non-zero voltage to the fuel level sensor for a pulse duration, during which a resistance of the sensor is measured. The resistance of the sensor may correspond to the fuel tank fuel level, with the resistance of the sensor increasing from a minimum resistance corresponding to a full tank fuel level as the fuel level decreases. Thus, the fuel level sensor may be used to measure the fuel level in the fuel tank during the transiently powering and not while the fuel level sensor is maintained unpowered. Furthermore, the transiently powering, and thus the fuel level measurement, may be performed responsive to the fuel tank refilling event and during select conditions, such as an indication that the fuel tank is not tilted and an indication that fuel slosh is not occurring. In this way, a high accuracy fuel level measurement may be obtained by the fuel level sensor, from which the fuel tank fuel level may be subsequently inferred while the fuel level sensor remains unpowered, including when dynamic conditions are not present.

As an example, a most recent fuel tank fuel level measurement made by the fuel level sensor and the amount of fuel consumed since the most recent fuel tank fuel level measurement may be used to infer the fuel tank fuel level while the fuel level sensor is maintained unpowered. The amount of fuel consumed may be determined based on one or more engine operating conditions, such as one or more fuel injection parameters, and then subtracted from the most recent fuel tank fuel level measurement (e.g., made during the transiently powering). As another example, responsive to the inferred fuel tank level decreasing below a threshold, the fuel level sensor may be repowered to measure the fuel tank fuel level with the fuel level sensor. In this way, an accurate fuel level may be displayed to a vehicle operator while the fuel level sensor is rarely used, decreasing electrical power consumption by the fuel level sensor and increasing vehicle fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for determining a fuel level of a fuel tank. The fuel tank may be included in a fuel system of a vehicle, such as the example vehicle system shown in FIGS. 1 and 2. As shown in FIG. 2, the fuel system may include a fuel level sensor disposed within the fuel tank for directly measuring the fuel level. The fuel level sensor may be a variable resistance sensor, such as shown in the example circuit diagram of FIG. 3. In particular, the fuel level sensor may be powered to measure the fuel level of the fuel tank under select operating conditions and remain unpowered under all other operating conditions, during which time the fuel level may be estimated based on an amount of fuel consumed since the previous fuel level measurement, such as according to the example method of FIG. 4. At least a subset of the select operating conditions may ensure that the fuel level measured by the fuel level sensor is highly accurate, such as elaborated with respect to the example method of FIG. 5. As a result, the fuel level sensor may be powered transiently during the select operating conditions, such as shown in the example timeline of FIG. 6, resulting in reduced electric power consumption by the fuel level sensor.

Figure 1:
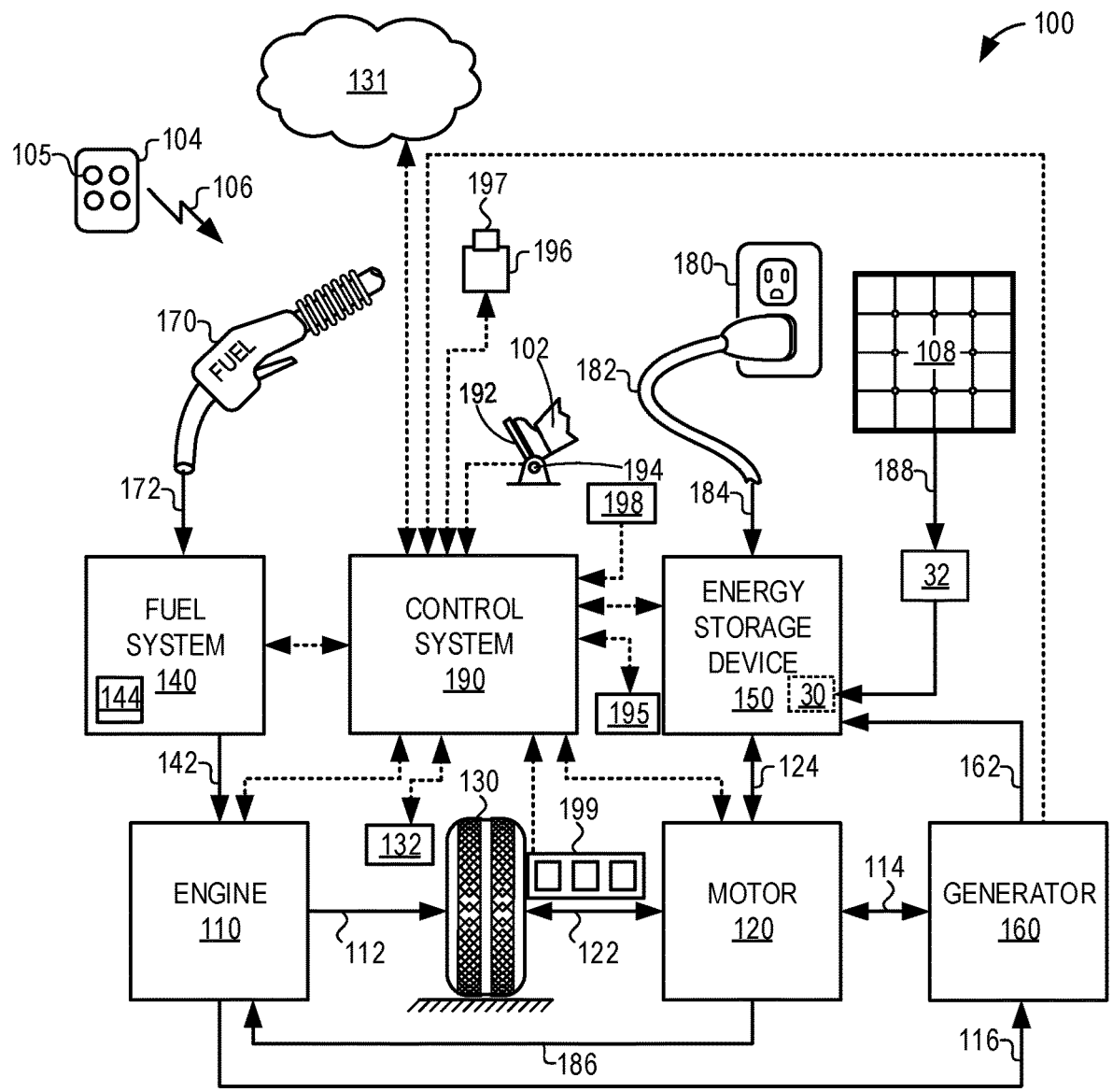
FIG. 1 schematically shows an example vehicle system.
Figure 2:
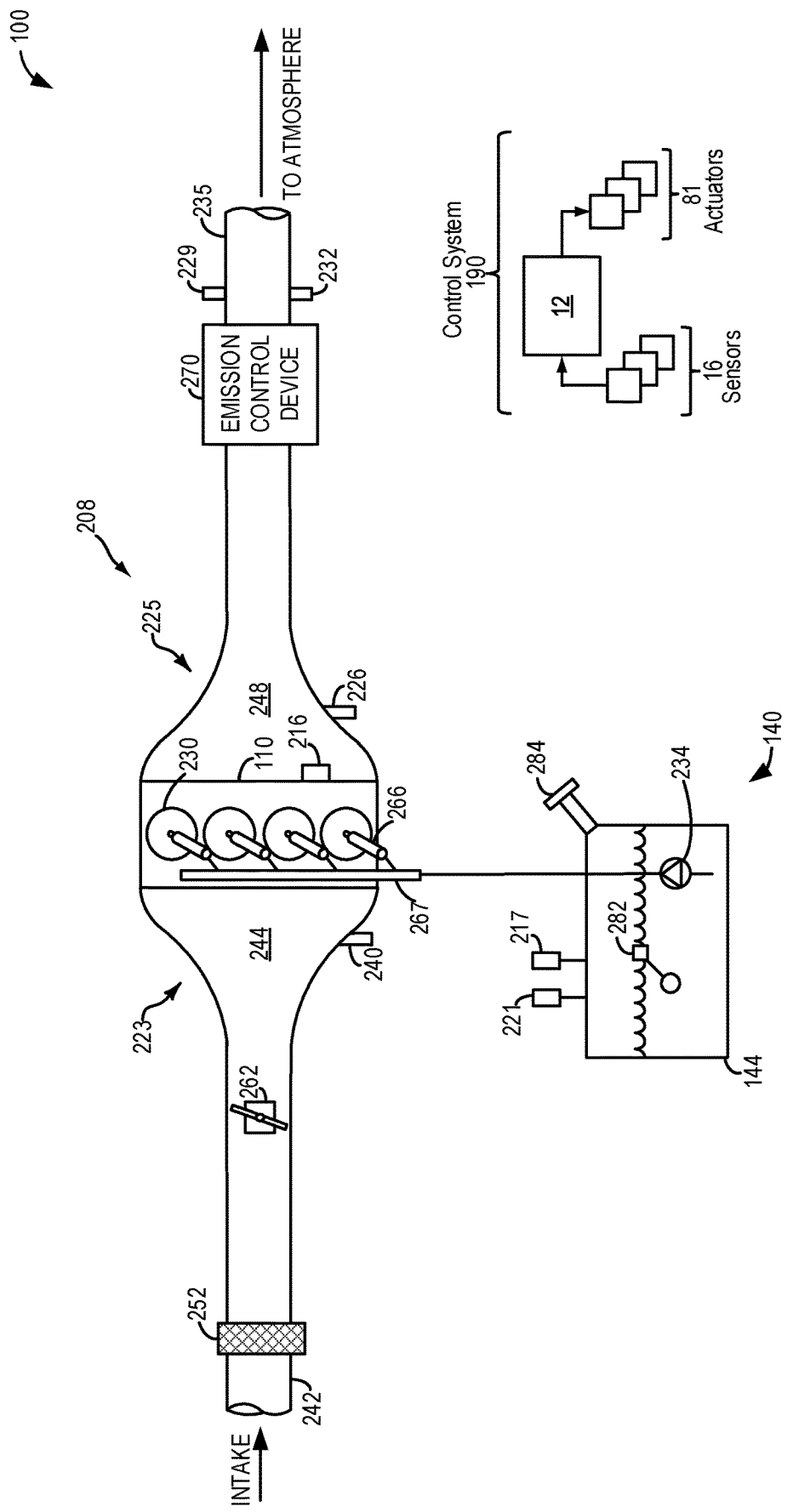
FIG. 2 shows a schematic depiction of a fuel system coupled to an engine system that may be included in a vehicle system.

FIG. 1 illustrates an example vehicle system 100. Vehicle system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with vehicle system 100 may be referred to as a hybrid electric vehicle (HEV). However, in other examples, vehicle system 100 may be a conventional vehicle having only engine 110 (and not motor 120) or an electric vehicle having only motor 120 (and not engine 110).

Vehicle system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued and the engine is at rest. For example, under select operating conditions, motor 120 may propel the vehicle via a drive wheel 130, as indicated by an arrow 122, while engine 110 is deactivated.

During other operating conditions, engine 110 may be set to a deactivated state (as described above) while motor 120 may be operated to charge an energy storage device 150. For example, motor 120 may receive wheel torque from drive wheel 130, as indicated by arrow 122, and may convert the kinetic energy of the vehicle to electrical energy for storage at energy storage device 150, as indicated by arrow 124. This operation may be referred to as regenerative braking of the vehicle. Thus, motor 120 may function as a generator in some examples. However, in other examples, a generator 160 may instead receive wheel torque from drive wheel 130 and may convert the kinetic energy of the vehicle to electrical energy for storage at energy storage device 150, as indicated by an arrow 162. As an additional example, motor 120 may use energy stored at energy storage device 150 to crank engine 110 in a starting operation, as indicated by an arrow 186. Energy storage device may include one or more batteries. For example, energy storage device may include one or more traction batteries and/or one or more starting, lighting, and ignition (SLI) batteries.

During still other operating conditions, engine 110 may be operated by combusting fuel received from a fuel system 140, as indicated by an arrow 142. For example, engine 110 may be operated to propel the vehicle via drive wheel 130, as indicated by an arrow 112, while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle system 100 may be configured as a series type vehicle propulsion system, whereby the engine does not directly propel the drive wheels. Rather, engine 110 may be operated to power motor 120, which may in turn propel the vehicle via drive wheel 130, as indicated by arrow 122. For example, during select operating conditions, engine 110 may drive generator 160, as indicated by an arrow 116, which may in turn supply electrical energy to one or more of motor 120, as indicated by an arrow 114, or energy storage device 150, as indicated by arrow 162. As another example, engine 110 may be operated to drive motor 120, which may in turn function as a generator to convert the engine output to electrical energy. The electrical energy may be stored at energy storage device 150 for later use by the motor, for example.

Fuel system 140 may include one or more fuel storage tanks 144 for storing fuel on-board the vehicle, one or more fuel pumps, and one or more fuel rails. For example, fuel tank 144 may store one or more liquid fuels, including (but not limited to) gasoline, diesel, and alcohol fuels. In some examples, the fuel may be stored on-board the vehicle as a blend of two or more different fuels. For example, fuel tank 144 may be configured to store a blend of gasoline and ethanol (such as E10, E85, etc.) or a blend of gasoline and methanol (such as M10, M85, etc.), whereby these fuels or fuel blends may be delivered to engine 110 as indicated by arrow 142. Still other suitable fuels or fuel blends may be supplied to engine 110, where they may be combusted to produce an engine output (e.g., torque). The engine output may be utilized to propel the vehicle (as indicated by arrow 112) or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

A control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback.

Control system 190 may receive an indication of an operator requested output of the vehicle propulsion system from a vehicle operator 102. For example, control system 190 may receive sensory feedback from a pedal position sensor 194 concerning a position of a pedal 192. Pedal 192 may refer schematically to a brake pedal and/or an accelerator pedal that may be depressed by vehicle operator 102. Furthermore, in some examples, control system 190 may be in communication with a remote engine start receiver 195 (or transceiver) that receives wireless signals 106 from a key fob 104 having a remote start button 105. In other examples (not shown), a remote engine start may be initiated via a cellular telephone or a smartphone-based system where a user's telephone sends data to a server and the server communicates with the vehicle to start the engine.

Energy storage device 150 may periodically receive electrical energy from a power source 180 residing external to the vehicle (e.g., an external stationary power grid that is not part of the vehicle), as indicated by an arrow 184. As a non-limiting example, vehicle system 100 may be configured as a plug-in HEV, whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle system 100 is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

In still other examples, vehicle system 100 may include one or more solar cells 108, operative to convert incident solar radiation into electrical energy. The solar cells 108 are electrically coupled to a solar battery 30 via a charge controller 32. Solar cells 108 and charge controller 32 are operative to supply electrical current for charging solar battery 30. In this example, solar battery 30 is housed within and electrically coupled to energy storage device 150, but in other configurations, solar battery 30 may be electrically coupled to energy storage device 150 while being housed separately. In still other configurations, solar battery 30 may be both physically and electrically isolated from energy storage device 150. Solar battery 30 may thus be configured to provide or receive charge from energy storage device 150, depending on engine operating conditions, charge status, and battery requirement(s). In some examples, solar battery 30 may be configured to independently supply charge directly to vehicle actuators and devices. Further, in some examples, charge controller 32 may be used to directly supply power to vehicle actuators and devices without requiring charge to first be stored in solar battery 30.

Solar cells 108 may be mounted on any convenient exterior surface of the vehicle, for example, a vehicle roof, hood, trunk, etc. However, solar cells 108 may additionally or alternatively be mounted on the interior of the vehicle, such as on a dashboard or other passenger compartment surface in proximity to a window or interior light bulb. In general, the solar cells are operative to convert solar radiation incident thereon into electrical energy. In some embodiments, solar cells 108 may comprise a series of photovoltaic cells formed from an amorphous semi-conductor material, such as silicon. Additionally, individual photovoltaic cells may be interconnected so as to provide a constant flow of electrical energy to a common output cable 188, which electrically couples solar cells 108 to charge controller 32 and solar battery 30. In this way, solar cells 108 may generate electrical energy with which to propel the vehicle or power one or more vehicle actuators and devices.

Fuel system 140 may periodically receive fuel from a fuel source residing external to the vehicle. As a non-limiting example, vehicle system 100 may be refueled by receiving fuel via a fuel dispensing device 170, as indicated by an arrow 172. In some examples, fuel tank 144 may be configured to store the fuel received from fuel dispensing device 170 until it is supplied to engine 110 for combustion. In some examples, control system 190 may receive an indication of the level of fuel stored in fuel tank 144 via a fuel level sensor. The level of fuel stored in fuel tank 144 (e.g., as identified by the fuel level sensor) may be communicated to the vehicle operator, for example, via a fuel gauge or indication in a vehicle instrument panel (e.g., message center) 196. Fuel system 140 and the fuel level sensor will be further described with respect to FIG. 2.

The vehicle system 100 may also include a tilt sensor 198 and a roll stability control sensor, such as a lateral and/or longitudinal and/or yaw rate sensor(s) 199. Tilt sensor 198 may be a single or a dual axis inclinometer, for example, that measures a slope or angle of the vehicle system 100. In some examples, output from tilt sensor 198 may be used in determining a fuel level in fuel tank 144, as further described with respect to FIG. 5. The vehicle instrument panel 196 may include indicator light(s) and/or a text-based display in which messages are displayed to an operator. The vehicle instrument panel 196 may also include various input devices for receiving an operator input, such as buttons, touch screens, voice input/recognition, etc. For example, the vehicle instrument panel 196 may include a refueling button 197, which may be manually actuated or pressed by a vehicle operator to initiate refueling.

Control system 190 may be communicatively coupled to other vehicles or infrastructures using appropriate communications technologies. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. Information exchanged between vehicles can be either directly communicated between vehicles or can be multi-hop. In some examples, longer range communications (e.g., WiMax) may be used in place of or in conjunction with V2V or V2I2V to extend the coverage area by a few miles. In still other examples, vehicle control system 190 may be communicatively coupled to other vehicles or infrastructures via wireless network 131 and the internet (e.g. the cloud). As an example, control system 190 may receive information from fuel dispensing equipment (e.g., fuel dispensing device 170), such as regarding a fuel amount dispensed, a fuel type expensed, etc.

Vehicle system 100 may also include an on-board navigation system 132 (for example, a Global Positioning System, GPS) that an operator of the vehicle may interact with. The navigation system 132 may include one or more location sensors for assisting in estimating vehicle speed, vehicle altitude, vehicle position/location, etc. This information may be additionally used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc.

Next, FIG. 2 schematically shows aspects of an example engine system 208, including engine 110, that may be coupled in vehicle system 100. Components described with reference to FIG. 2 that have the same identification labels as components described with reference to FIG. 1 are the same components and may operate as previously described. Further, some components in FIG. 1 may not be reintroduced in FIG. 2.

Engine 110 is shown having a plurality of cylinders 230. Engine 110 may include an engine intake system 223 and an engine exhaust system 225. Engine intake system 223 may include an intake manifold 244 fluidically coupled to an intake passage 242. Intake air may be routed to an intake throttle 262 after passing through an air filter 252 coupled to intake passage 242 upstream of intake throttle 262. Engine exhaust system 225 includes an exhaust manifold 248 leading to an exhaust passage 235 that routes exhaust gas to the atmosphere. Engine exhaust system 225 may include one or more emission control devices 270, which may be mounted in a close-coupled position. The one or more emission control devices may include a three-way catalyst, a lean nitrogen oxide (NOx) trap, a selective catalytic reduction (SCR) catalyst, a particulate filter (e.g., a diesel particulate filter or a gasoline particulate filter), an oxidation catalyst, etc. As one example, one or more NOx sensors may be positioned upstream and/or downstream of emission control device 270, such as for measuring an efficiency of NOx conversion by emission control device 270. It will be appreciated that other components may be included in the engine, such as a variety of valves and sensors, as further elaborated in herein. In some embodiments, where engine system 208 is a boosted engine system, the engine system may further include a boosting device, such as a turbocharger (not shown).

Engine system 208 is coupled to fuel system 140. Although not illustrated, in some examples, engine system 208 may also be coupled to an evaporative emissions system. Fuel system 140 includes fuel tank 144 coupled to a fuel pump 234, the fuel tank supplying a fuel to engine 110 that propels vehicle system 100, as described above with respect to FIG. 1. During a fuel tank refueling event, fuel may be pumped into the vehicle from an external source through a refueling port 284. A fuel level sensor 282 located in fuel tank 144 may provide an indication of a fuel level ("Fuel Level Input") to a controller 12 of control system 190. As depicted, fuel level sensor 282 may comprise a float connected to a variable resistor. In some examples, the variable resistor may be a potentiometer. As an example, the variable resistor may read 10Ω when fuel tank 144 is full and 180Ω when fuel tank 144 is empty and a value in a range between 10Ω and 180Ω when the fuel tank 144 is partially filled. Voltage, such as supplied by energy storage device 150 shown in FIG. 1, may be supplied across fuel level sensor 282 to sense the resistance and thus determine the fuel level. An example circuit of fuel level sensor 282 will be described with respect to FIG. 3.

Fuel pump 234 is configured to deliver pressurized fuel to fuel injectors of engine 110, such as an example fuel injector 266. One or more fuel injectors may be provided for each cylinder. For example, pressurized fuel may be delivered to fuel injector 266 and the additional fuel injectors via a fuel rail 267. It will be appreciated that fuel system 140 may be a return-less fuel system, a return fuel system, or various other types of fuel system.

One or more pressure sensors may be coupled to fuel system 140 for providing an estimate of a fuel system pressure. In the example illustrated in FIG. 2, a fuel tank pressure sensor 217 is coupled directly to fuel tank 144. For example, fuel tank pressure sensor 217 may be a fuel tank pressure transducer (FTPT) coupled to fuel tank 144 for measuring a pressure of fuel system 140. One or more temperature sensors 221 may also be coupled to fuel system 140 for providing an estimate of a fuel system temperature. In one example, the fuel system temperature is a fuel tank temperature, wherein temperature sensor 221 is a fuel tank temperature sensor coupled to fuel tank 144.

Control system 190 is shown receiving information from a plurality of sensors 16 (various examples of which are described herein) and sending control signals to a plurality of actuators 81 (various examples of which are described herein). As one example, sensors 16 may include an exhaust gas sensor 226 located upstream of emission control device 270, a temperature sensor 232 coupled to exhaust passage 235, a manifold absolute pressure (MAP) sensor 240 coupled to intake manifold 244, an engine coolant temperature sensor 216 coupled to a cooling sleeve of engine 110, fuel tank pressure sensor 217, temperature sensor 221, fuel level sensor 282, and a pressure sensor 229 located downstream of emission control device 270. Other sensors, such as additional pressure, temperature, air/fuel ratio, and composition sensors, may be coupled to various locations in the vehicle system 100. For example, an estimate of the MAP or manifold vacuum (ManVac) may be obtained by controller 12 from MAP sensor 240. Alternatively, MAP may be inferred from alternate engine operating conditions, such as mass air flow (MAF), as measured by a MAF sensor (not shown) coupled to intake manifold 244. As another example, actuators 81 may include fuel injector 266, fuel pump 234, and throttle 262.

As described above with reference to FIG. 1, control system 190 may further receive information regarding the location of the vehicle from an on-board GPS. Information received from the GPS may include vehicle speed, vehicle altitude, vehicle position, etc. This information may be used to infer engine operating parameters, such as local barometric pressure. Control system 190 may further be configured to transmit or receive information via the internet or other communication networks. Information received from the GPS may be cross-referenced to information available via the internet to determine local weather conditions, local vehicle regulations, etc. Control system 190 may use the internet to obtain updated software modules, which may be stored in non-transitory memory.

Controller 12 of control system 190 may be configured as a conventional microcomputer including a microprocessor unit, input/output ports, read-only memory, random access memory, keep alive memory, a CAN bus, etc. Controller 12 may be configured as a powertrain control module (PCM) or an engine control module (ECM), for example. Controller 12 may receive input data from the various sensors, process the input data, and trigger the actuators in response to the processed input data based on instructions or code programmed therein corresponding to one or more routines. Example control routines are described herein with regard to FIGS. 4 and 5.

In some examples, controller 12 may be placed in a reduced power mode or sleep mode, wherein the control module maintains essential functions only and operates with a lower battery consumption than in a corresponding awake mode. For example, the controller may be placed in the sleep mode following a vehicle key-off event (e.g., a vehicle operator removing a key from a vehicle, leaving the proximity of the vehicle with a key fob, and/or otherwise instructing the vehicle to be in an off/inoperative state, at which time the engine may be stopped rotating and electrical propulsion devices, if present, may be deactivated). The controller may have a wake input that allows the controller to be returned to the awake mode based on an input received from one or more sensors. For example, the opening of a vehicle door or unlocking of the vehicle (e.g., via a key or a key fob, such as key fob 104 shown in FIG. 1) may trigger a return to an awake mode. In still other examples, controller 12 may be scheduled to wake intermittently to perform one or more afterrun tasks while the vehicle is off. As one example, as described further herein with respect to FIG. 5, controller 12 may measure the fuel level in fuel tank 144 via fuel level sensor 282 in response to the vehicle being unlocked while off, which may correspond to a high confidence fuel level measurement condition.

Figure 3:
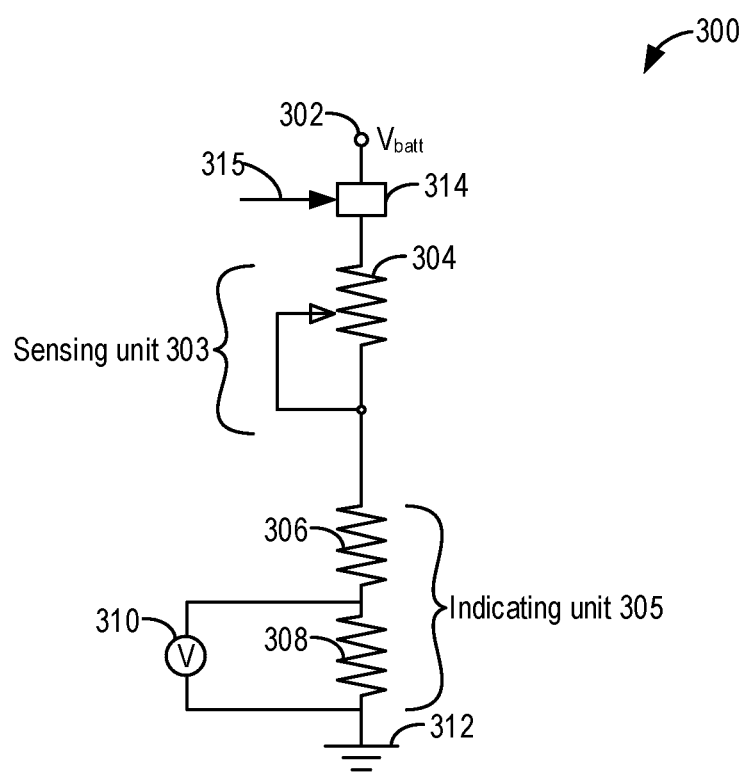
FIG. 3 shows an example circuit diagram of a fuel level sensor.

Next, FIG. 3 shows an example electrical circuit 300 of a fuel level sensor. Electrical circuit 300 includes a voltage source 302, which may be a vehicle battery (e.g., energy storage device 150 of FIG. 1), that supplies voltage to the fuel level sensor and a ground 312. Electrical circuit 300 may be subdivided into a sensing unit 303, which may include the in-tank components of the fuel level sensor for sensing the fuel level (e.g., fuel level sensor 282 shown in FIG. 2), and an indicating unit 305, which may include a display on an instrument panel (such as instrumental panel 196 of FIG. 1) for indicating the sensed fuel level to a vehicle operator. A resistor 304 of sensing unit 303 is shown as a potentiometer that varies from 10Ω (minimum resistance) and 180Ω (maximum resistance), in one example, based on a level of fuel in the fuel tank. For example, as the tank empties and the fuel level decreases, the float of the fuel level sensor drops and slides a moving contact along the resistor 304, increasing its resistance. The resistance may be determined by sending electric current through resistor 304. Indicating unit 305 includes a first resistor 306 and a second resistor 308, which together have a fixed resistance of approximately 70Ω, in one example (although other fixed resistances are possible in alternate embodiments). Therefore, a total minimum resistance of electrical circuit 300 may be approximately 80Ω, in one example, corresponding to a full fuel tank. Electrical circuit 300 further includes a voltmeter 310, which may be used to measure an electric potential across second resistor 308.

Fuel level sensors are typically powered continuously (while the vehicle is powered on and/or in a ready to drive state). In a first example, powering the fuel level sensor continuously may include no interruptions in electrical power supplied to the fuel level sensor over an entire drive cycle or an on/off period of the engine. In a second example, the fuel level sensor may be continuously supplied with a series of non-zero voltage pulses while the engine is on and operating, each of the non-zero voltage pulses having a pulse duration and an unpowered (e.g., power off) period of no voltage between each non-zero voltage pulse. Therefore, powering the fuel level sensor continuously may include a single unpowered period not surpassing a first threshold duration (e.g., a portion of a second) in the second example. As an example, the unpowered period may be less than the pulse duration when the fuel level sensor is powered continuously (e.g., in a pulsed mode). However, powering the fuel level sensor continuously may increase vehicle power consumption. As one example, a typical battery voltage may be 13.2 V during a Federal Test Procedure (FTP) to determine vehicle fuel economy. Therefore, with a minimum resistance of 80Ω and a voltage of 13.2 V, using Ohm's law, an amount of electrical power consumed by the fuel level sensor may be 2.2 W during the FTP. If more than one fuel level sensor is included in the vehicle, such as when more than one fuel tank is present or the fuel tank is a saddle tank, the electrical power consumption may be higher (e.g., 4.4 W for two fuel level sensors). Reducing electrical power consumption by the fuel level sensor would increase vehicle fuel economy during the FTP and during vehicle driving.

Electrical power consumption by the fuel level sensor may be reduced by powering the fuel level sensor intermittently (e.g., at regular or irregular intervals) or transiently (e.g., for a brief duration, followed by maintaining the fuel level sensor unpowered) instead of continuously. For example, powering the fuel level sensor intermittently may include powering the fuel level sensor with a series of non-zero voltage pulses while the engine is on and operating, with the unpowered period of no voltage between each non-zero voltage pulse equal to a second threshold duration, which is greater than the first threshold duration described above. The second threshold duration may be a non-zero time duration in a range of seconds (e.g., 5-120 seconds) or minutes (e.g., 3-5 minutes). The unpowered period of no voltage may be much greater than the pulse duration of each non-zero voltage pulse when the fuel level sensor is powered intermittently. As an example, if the electrical circuit 300 were powered for only 1 second out of 100 seconds (e.g., 1% of an amount of time), electrical power consumption by the fuel level sensor would drop from 2.2 W to 0.022 W during the FTP, thereby increasing fuel economy during the FTP and reducing costs to vehicle manufacturers. As another example, the fuel level sensor may be powered intermittently when the fuel level in the fuel tank is low (e.g., less than a threshold), as will be described below with respect to FIG. 4. Furthermore, in some examples, the second threshold duration may be adjusted based on the fuel level measured during each non-zero voltage pulse, as also described below with respect to FIG. 4.

In contrast, powering the fuel level sensor transiently may include powering the fuel level sensor for a brief period (e.g., three seconds or less), such as by supplying a single non-zero voltage pulse or a series of non-zero voltage pulses over the brief period, to perform a single sensor resistance measurement. After the brief period of powering, the fuel level sensor is maintained unpowered for at least a third threshold duration, which is greater than the first and second threshold durations described above. The third threshold duration refers to a non-zero time duration and may be in a range of minutes (e.g., 10-60 minutes). As an example, the fuel level sensor may be powered transiently to obtain a single high accuracy fuel level measurement in response a refueling event, as will be described below with respect to FIGS. 4 and 5. By powering the fuel level sensor intermittently or transiently instead of continuously during the FTP and after the FTP, both vehicle manufacturers and vehicle customers may benefit from increased fuel economy and reduced vehicle operating costs.

As one example, a relay or a field-effect transistor (FET) may be used to selectively provide power to electrical circuit 300 of the fuel level sensor. In the example of FIG. 3, a FET 314 is shown positioned between voltage source 302 and resistor 304 of sensing unit 303. FET 314 may serve as an electronic switch, enabling voltage source 302 to supply voltage to sensing unit 303 and indicating unit 305 in response to a command signal 315 from a controller (e.g., controller 12 shown in FIG. 2). For example, responsive to FET 314 receiving a first command signal from the controller, the fuel level sensor may be powered on. Responsive to a second, different command signal from the controller to FET 314 (or an absence of the first command signal), the fuel level sensor may remain off and unpowered, with no voltage supplied to sensing unit 303 and indicating unit 305 from voltage source 302.

As another example, the FET may be included in the controller instead of in the circuit 300. In still another example, the FET may be included in a power distribution box, including a relay and a fuse. In a further example, an electronic power distribution box may be used to selectively provide power to electrical circuit 300 of the fuel level sensor, the electronic power distribution box including a FET controlled via a dedicated microcontroller in response to command signals from another controller (e.g., controller 12 of FIG. 2), which may be received over a controller area network.

The fuel level sensor may be a slowly changing resistive sensor due to the fuel level gradually decreasing as fuel is consumed. Furthermore, the fuel consumption may be calculated by a controller (e.g., controller 12 of FIG. 2) using a model. Therefore, the fuel level in the fuel tank may be measured via the fuel level sensor only under select conditions. After the fuel level is measured, the fuel level may be inferred based on the amount of fuel consumed while the fuel level sensor is maintained unpowered.

Figure 4:
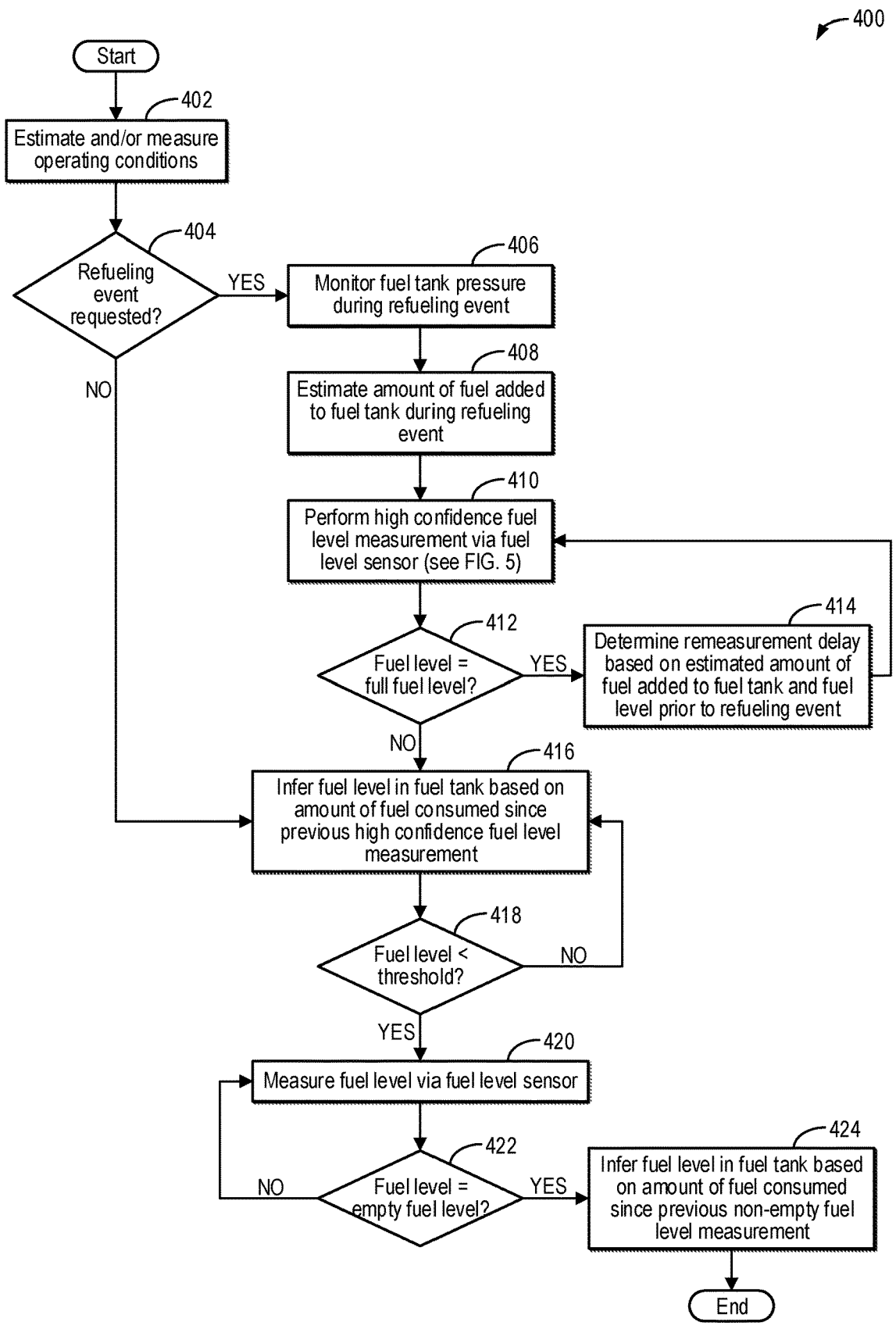
FIG. 4 is a flow chart of a high-level example method for determining a fuel level in a fuel tank.

FIG. 4 shows a flow chart of an example method 400 for determining a level (e.g., an amount) of fuel in a fuel tank of a fuel system (e.g., fuel tank 144 of fuel system 140 shown in FIGS. 1 and 2). For example, a fuel level sensor (e.g., fuel level sensor 282 of FIG. 2) may be used to measure the fuel level under select conditions, and the fuel level may be inferred during other conditions when the fuel level is not measured by the fuel level sensor. Instructions for carrying out method 400 and the rest of the methods included herein may be executed by a controller (e.g., controller 12 of FIG. 2) based on instructions stored on a memory of the controller and in conjunction with signals received from sensors of the engine system, such as the sensors described above with reference to FIGS. 1 and 2, including the fuel level sensor. The controller may employ actuators of the engine system to adjust engine operation according to the methods described below.

Method 400 begins at 402 and includes estimating and/or measuring operating conditions. Operating conditions may include, for example, fuel tank pressure, ambient temperature, a state of the engine, an ignition state of the vehicle, vehicle speed, vehicle location (as determined through an on-board GPS, for example), etc. The state of the engine may refer to whether the engine is on (e.g., operating at a non-zero speed, with combustion occurring within engine cylinders) or off (e.g., at rest, without combustion occurring in the engine cylinders). The ignition state of the vehicle may refer to a position of an ignition switch. As an example, the ignition switch may be in an "off" position, indicating that the vehicle is off (e.g., powered down), or in an "on" position, in which the vehicle is on (e.g., with power supplied to vehicle systems). The state of the engine and the state of the vehicle may be different. For example, the vehicle may be on and operating in an electric-only mode, in which an electric motor (e.g., motor 120 of FIG. 1) supplies torque to propel the vehicle and the engine is off and does not supply torque to propel the vehicle. As another example, the vehicle may be on and the engine may be shut off during an idle-stop. As still another example, the ignition switch may be in an "accessory" position that powers the vehicle without starting a propulsion device (e.g., the engine and the electric motor both remain off). In a further example, the controller may be transitioned to an awake mode in response to a wake input, such as a door ajar signal or a vehicle unlock event, while the ignition switch remains in the "off" position.

At 404, method 400 includes determining if a refueling event is requested. For example, it may be determined that a refueling event is requested responsive to a depression of a refueling button (e.g., refueling button 197 of FIG. 1) on a vehicle instrument panel (e.g., vehicle instrument panel 196 of FIG. 1). In other examples, a refueling event may be anticipated by detecting a proximity to a refueling station. For example, the vehicle's proximity to a refueling station may be determined via an on-board GPS (e.g., GPS 132 of FIG. 1) or through wireless communication between the vehicle and a refueling pump. In other examples, it may be determined that a refueling event is requested in response to a refueling door being opened or another attempt to gain access to the fuel system, such as via a refueling port (e.g., refueling port 284 of FIG. 2).

If it is determined that a refueling event is not requested, such as when the engine is on and operating and/or the refueling button is not depressed, method 400 proceeds to 416 and includes inferring the fuel level in the fuel tank based on an amount of fuel consumed since the previous high confidence fuel level measurement, as will be described below with reference to the method at 416. Briefly, the fuel level sensor is maintained unpowered, and the fuel level in the fuel tank is not measured by the fuel level sensor. Instead, the fuel level in the fuel tank is estimated using a fuel consumption model and a previously recorded (e.g., the most recently recorded) high confidence fuel level measurement. For example, the amount of fuel consumed since the previous high confidence fuel level measurement may be subtracted from the previous high confidence fuel level measurement to infer the fuel level in the fuel tank without additional output from the fuel level sensor.

If it is determined that a refueling event is requested at 404, method 400 proceeds to 406 and includes monitoring the fuel tank pressure during the refueling event. The fuel tank pressure may be monitored via a fuel tank pressure sensor, such as FTPT 217 of FIG. 2, and stored in a memory of the controller.

At 408, method 400 includes estimating an amount of fuel added to the fuel tank during the refueling event. As one example, the refueling pump may wirelessly communicate the amount of fuel added to the fuel tank. For example, the refueling pump may measure the amount of fuel dispensed, a flow rate of the fuel during the dispensing, the duration of the dispensing, etc., and communicate this information to the controller. As another example, the controller may determine a steady-state fuel tank pressure during the refueling event based on the fuel tank pressure monitored via the fuel tank pressure sensor (e.g., at 406), and may use the determined steady-state fuel tank pressure to determine the amount of fuel added to the fuel tank. The steady-state pressure may occur between an initial pressure change and a final pressure change, with an amount of time that elapses between the initial pressure change and the final pressure change defining a duration of the steady-state pressure. The initial pressure change may correspond to an increase of pressure, indicating an influx of liquid fuel into the fuel tank, and/or may correspond to a decrease in pressure following the initial increase in pressure. For example, the initiation of the refueling event may cause an immediate pressure spike above the steady-state pressure. The final pressure change may correspond to a decrease in pressure from the steady-state pressure, (e.g., due to cessation of the fuel dispensing) or an increase in pressure from the steady-state pressure (e.g., due to the fuel level approaching a full fuel level). The amount of fuel added may be determined based on the steady-state fuel tank pressure and the duration of the steady-state fuel tank pressure during the refueling event. For example, the steady-state fuel tank pressure may correspond to a fuel flow rate of the refueling pump (e.g., fuel dispensing device 170 shown in FIG. 1). As such, the controller may input the steady-state fuel tank pressure into a look-up table, algorithm, or map stored in non-transitory memory and output the fuel flow rate. The fuel flow rate may be multiplied by the duration of the steady-state pressure to estimate the amount of fuel added to the fuel tank during the refueling event, which may be stored in a memory of the controller.

At 410, method 400 includes performing a high confidence fuel level measurement via the fuel level sensor, as will be described below with respect to FIG. 5. For example, the controller may power the fuel level sensor and measure a resistance of the sensor (e.g., of electrical circuit 300 shown in FIG. 3) responsive to conditions for performing the high confidence fuel measurement being met. The controller may relate the measured resistance to the fuel level using a predetermined look-up table, function, or map. In some examples, the controller may also convert the fuel level into a fuel amount (e.g., a volume of fuel) via a predetermined look-up table, function, or map. In this way, the fuel level measurement may have increased accuracy, and power consumption by the fuel level sensor may be reduced by only powering the fuel level sensor under select conditions.

At 412, method 400 includes determining if the fuel level measured by the fuel level sensor is equal to the full fuel level. For example, it may be determined that the fuel level is equal to the full fuel level if the resistance of the fuel level sensor is at a known minimum of the sensor that corresponds to the full fuel level (e.g., 80Ω). Certain types of fuel level sensors, such as float-type sensors, may be unable to provide an exact and accurate fuel level measurement when the fuel level is very high. For example, the fuel level sensor may be unable to distinguish between fuel levels within a threshold range around the full fuel level. Further, the full fuel level may not correspond to an actual maximum capacity of the fuel tank due to vapor head space, for example. As a result, the resistance measurement of the sensor may be the same for nearly full fuel levels (e.g., less than the full fuel level and within the threshold range) and overfull fuel levels (e.g., greater than the full fuel level and within the threshold range). In some examples, the threshold range may be symmetric about the full fuel level such that a lower bound of the threshold range is a same amount from the full fuel level as an upper bound of the threshold range. In other examples, the threshold range may be asymmetric about the full fuel level such that the lower bound of the threshold range is a different amount from the full fuel level than the upper bound of the threshold range. Therefore, despite high confidence fuel level measurement conditions being met, the measured fuel level itself may indicate that a high confidence fuel level measurement cannot be obtained. However, a full fuel level may be displayed to a vehicle operator, such as on the instrument panel, as the fuel tank is approximately full.

If the fuel level is equal to the full fuel level (e.g., the measured resistance of the sensor is at the minimum), method 400 proceeds to 414 and includes determining a remeasurement delay based on the estimated amount of fuel added to the fuel tank (e.g., as estimated at 408) and a fuel level prior to the refueling event. The remeasurement delay may be an amount of fuel to be consumed prior to the remeasurement or a duration of engine operation prior to the remeasurement that is expected to bring the fuel level just below the threshold range so that the resistance of the fuel level sensor accurately reflects the fuel level of the fuel tank. For example, the controller may add the fuel level prior to the refueling event, which may be a measured or an inferred value stored in memory, to the estimated amount of fuel added during the refueling event to estimate the fuel level. The controller may then input the estimated fuel level into a look-up table, algorithm, or map and output the remeasurement delay for the corresponding estimated fuel level. In an alternative example, the remeasurement delay may be a pre-set value that is not be adjusted based on the estimated amount of fuel added and the fuel level prior to the refueling event. As one example, the pre-set value may correspond to a fixed amount of fuel to be consumed prior to the remeasurement. In another example, the pre-set value may be a fixed duration of engine operation prior to the remeasurement. The pre-set value may be calibrated based on the full fuel level of the fuel tank and the actual maximum capacity of the fuel tank, in some examples. The high confidence fuel level measurement may be performed after the determined or pre-set remeasurement delay, such as by method 400 returning to 410.

If the fuel level is not equal to the full fuel level (e.g., the measured resistance of the fuel level sensor is greater than the minimum resistance), method 400 proceeds to 416 and includes inferring the fuel level based on the amount of fuel consumed since the previous high confidence fuel level measurement (e.g., as measured at 410). For example, after the high confidence fuel level measurement is performed, such as will be described with respect to FIG. 5, the controller may update the fuel level by subtracting the amount of fuel consumed by the engine from the previous high confidence fuel level measurement. The amount of fuel consumed may be determined based on one or more engine operating parameters and using one or more models or algorithms. As one example, the amount of fuel consumed may be determined by integrating (e.g., summing) an amount of fuel injected into the engine since the high confidence fuel level measurement was recorded. For example, the controller may determine the amount of fuel injected by fuel injectors of the engine (e.g., fuel injector 266 shown in FIG. 2) by inputting fuel injection parameters, such as the amount of time each fuel injector has stayed open (e.g., based on a pulse-width of a command signal for each fuel injection), the size of the nozzle of each fuel injector, the fuel injection pressure during each injection, etc. into one or more look-up tables, maps, or algorithms. Additionally or alternatively, the controller may input one or more of engine speed data, MAP data, MAF data, and exhaust gas air-fuel ratio data gathered since the previous high confidence fuel level measurement was recorded into one or more look-up tables, algorithms, or maps and output the amount of fuel consumed. Such models may provide a high accuracy measure of the amount of fuel consumed since the previous high accuracy fuel level measurement. The inferred fuel level may be displayed to the vehicle operator on the instrument panel, for example, such as via a fuel gauge or another type of fuel meter display. As another example, additionally or alternatively, the inferred fuel level may be reported to the vehicle's fleet owner, which may be a car rental agency, in order to accurately track an amount of fuel consumed versus added by a rental customer, for example. While the fuel level is inferred at 416, the fuel level sensor is maintained unpowered (e.g. the fuel level sensor is turned off). Further, the fuel level sensor may remain unpowered, with no voltage supplied to the fuel level sensor, until a subsequent refueling event or until the inferred fuel level decreases below a threshold fuel level, as will be described below with respect to 418. By inferring the fuel level based on the amount of fuel consumed instead of continuously measuring the fuel level with the fuel level sensor, electrical power consumption by the fuel level sensor is reduced, thereby increasing vehicle fuel economy.

At 418, it is determined if the inferred fuel level is less than the threshold fuel level. The threshold fuel level may be a positive, non-zero fuel level corresponding to the fuel tank approaching a low (but not empty) fuel condition. As an example, the threshold fuel level may correspond to a fuel amount in a range from 1 to 5 gallons. As another example, the threshold fuel level may correspond to a percentage of the fuel tank capacity, such as in a range from 1 to 5%. As still another example, the threshold fuel level may be a distance to empty (e.g., DTE), such as a number of miles until the fuel tank is expected to reach empty. In such an example, the threshold fuel level may be a non-zero distance in a range from 5 miles to less than a mile (e.g., a quarter of a mile). In some examples, the threshold fuel level may correspond with illuminating a low fuel warning light on the instrument panel to alert the vehicle operator to seek a refueling station. In other examples, the threshold fuel level may be higher or lower than that for turning on the low fuel warning light.

If the inferred fuel level is not less than the threshold fuel level, such as when the inferred fuel level is at or above the threshold fuel level, method 400 may return to 416 to continue inferring the fuel level in the fuel tank based on the amount of fuel consumed since the previous high confidence fuel level measurement and not powering the fuel level sensor. Therefore, while conditions remain for inferring the fuel level in the fuel tank, such as while the fuel level is less than the full fuel level and greater than threshold fuel level and while a refueling event is not indicated, no electrical power (including no pulses of electrical power) will be provided to the fuel level sensor for the entirety of the conditions.

If the inferred fuel level is less than the threshold fuel level, method 400 proceeds to 420 and includes measuring the fuel level via the fuel level sensor. With the fuel level less than the threshold fuel level, the fuel level may be confirmed via the fuel level sensor because small inaccuracies in the inferred value may result in the fuel tank reaching empty sooner than expected. For example, any inaccuracies in the inferred value may give the vehicle operator an incorrect estimation of a drivable distance with the remaining fuel. Measuring the fuel level via the fuel level sensor may include supplying electrical power to the fuel level sensor to repower the sensor, such as from a vehicle battery (e.g., energy storage device 150 shown in FIG. 1), and measuring the resistance of the sensor. For example, the controller may send an actuation signal to the circuit of the fuel level sensor to provide power to the fuel level sensor (after previously not having been supplied power). As one example, during the method at 420, the fuel level sensor may be powered intermittently, such as by supplying the fuel level sensor with voltage pulses, each voltage pulse having a pulse duration and an interval between each pulse during which no voltage (e.g., 0 V) is supplied. As an illustrative example, the fuel level sensor may be supplied with a non-zero voltage for 1 second, such as by providing a command signal to a FET of the fuel level sensor circuit (e.g., FET 314 of FIG. 3), during which the sensor resistance is measured and recorded, and then supplied with zero voltage for 10 seconds before another 1-second voltage pulse. Thus, the fuel level measurement may occur while the fuel level sensor is powered (e.g., during the voltage pulse) and not while the fuel level sensor is unpowered (e.g., during the interval). Further, the fuel level sensor may be constantly powered during the measurement (e.g., for the duration of the voltage pulse). Additionally, in some examples, the pulse duration and/or the interval may be adjusted based on the measured fuel level. For example, the interval may be decreased as the measured fuel level decreases so that the fuel level is measured more frequently. Alternatively, the interval may be increased as the measured fuel level decreases to that the fuel level is measured less frequently.

Furthermore, in some examples, the controller may compensate the measured fuel level for vehicle tilt. Vehicle tilt may result in the fuel being unevenly distributed throughout the fuel tank (e.g., due to gravity). Therefore, the fuel level sensor may output an increased or a decreased fuel level measurement depending on the tilt angle and a position of the fuel level sensor within the fuel tank. The controller may input the fuel level measurement and at least one of the first tilt angle and the second tilt angle into one or more look-up tables, functions, or maps and output a corrected fuel level measurement. The one or more look-up tables, functions, or maps may include pre-determined relationships between the fuel level measurement output by the fuel level sensor, the vehicle tilt, and the actual fuel level (e.g., as measured when the fuel tank is level) and may be stored in non-transitory memory. In this way, the controller may compensate for the effect of vehicle tilt on the fuel level measurement to increase the accuracy of the fuel level measurement. The measured fuel level may be displayed to the vehicle operator on the instrument panel, for example.

At 422, method 400 includes determining if the fuel level is equal to an empty fuel level. For example, it may be determined that the fuel level is equal to the empty fuel level if the resistance of the fuel level sensor is at a known maximum of the sensor that corresponds to the empty fuel level (e.g., 250Ω). Certain types of fuel level sensors, such as float-type sensors, may be unable to provide an exact and accurate fuel level measurement when the fuel level is very low and near empty. For example, the fuel level sensor may be unable to distinguish between fuel levels within a threshold amount of the empty fuel level. As a result, the resistance measurement of the sensor may be the same for nearly empty fuel levels (e.g., within the threshold amount of the empty fuel level) and the empty fuel level (e.g., where substantially no usable fuel is present in the fuel tank). As one non-limiting example, the threshold amount may be within 1% of the empty fuel level.

If the fuel level is not equal to the empty fuel level, method 400 returns to 420, and the fuel level may continue to be measured via the fuel level sensor until the fuel tank is refilled and the fuel level is greater than the threshold fuel level or until the fuel tank level reaches the empty fuel level. Furthermore, in some examples where the vehicle is a HEV, the vehicle may be transitioned to operating in the electric-only mode or an electric assist mode (where the vehicle is propelled by a combination of electric motor torque and engine torque) in order to reduce fuel consumption. If the fuel level is equal to the empty fuel level (e.g., the fuel level sensor resistance is maximum), method 400 proceeds to 424 and includes inferring the fuel level in the fuel tank based on an amount of fuel consumed since the previous non-empty fuel level measurement (e.g., non-maximum fuel level sensor resistance measurement). Because the fuel level sensor is saturated and the measurement does not change in response to changing fuel levels when the fuel level is within the threshold amount of the empty fuel level, the fuel level measured by the fuel level sensor may not reflect the actual fuel level. Therefore, the controller may update the fuel level by subtracting the amount of fuel consumed by the engine from the most recent unsaturated (e.g., non-maximum resistance) measurement recorded prior to the saturated (e.g., maximum resistance) measurement. The amount of fuel consumed may be determined based on one or more engine operating parameters and using one or more models or algorithms, as described above at 416. The inferred fuel level may be displayed to the vehicle operator on the instrument panel, for example, such as via a fuel gauge or another type of fuel meter display. As another example, additionally or alternatively, the inferred fuel level may be reported to the vehicle's fleet owner. While the fuel level is inferred at 424, the fuel level sensor is maintained unpowered (e.g. the fuel level sensor is turned off). Following 424, method 400 ends.

Figure 5:
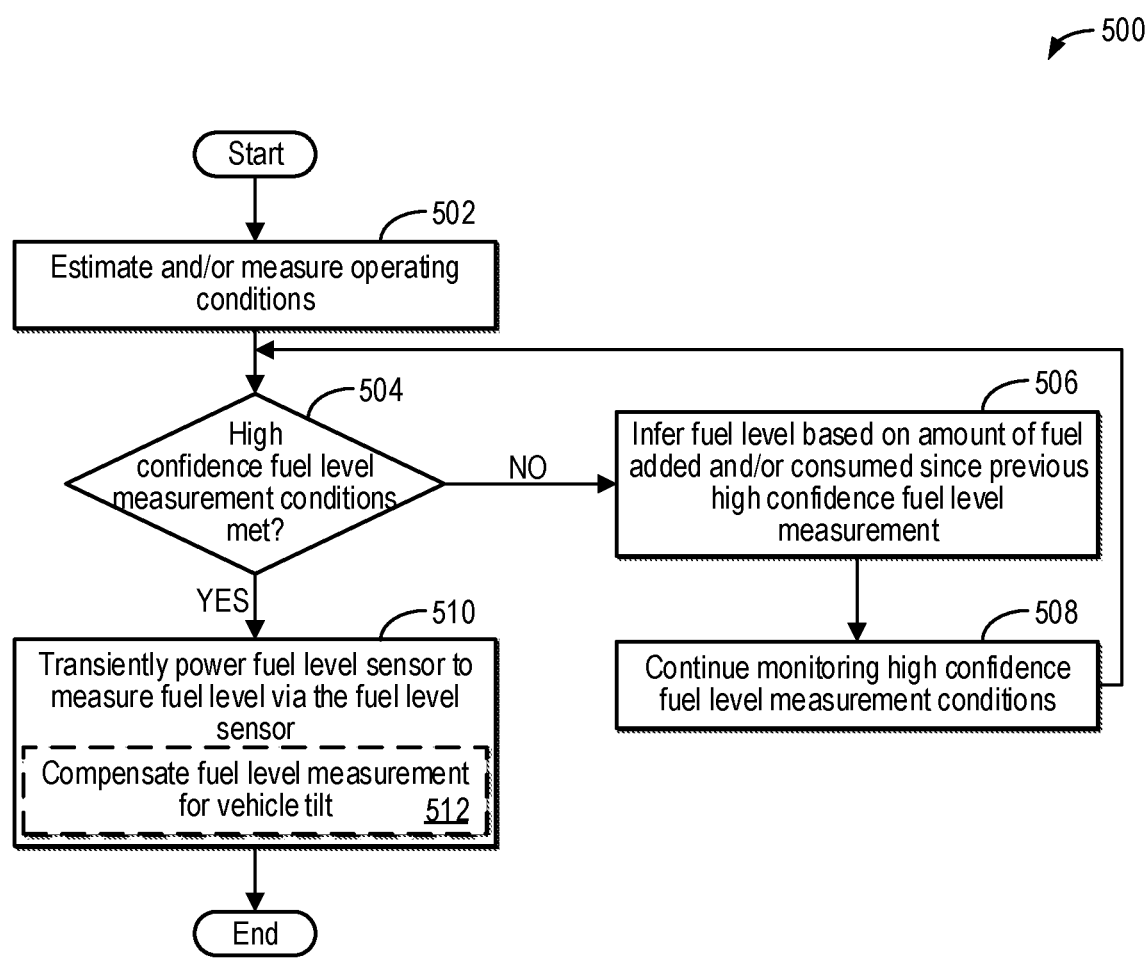
FIG. 5 is a flow chart of an example method for performing a high confidence fuel level measurement with a fuel level sensor.

Continuing to FIG. 5, an example method 500 for performing a high confidence fuel level measurement with a fuel level sensor, such as fuel level sensor 282 of FIG. 2, is shown. In particular, the high confidence fuel level measurement may be used to subsequently infer the fuel level of a vehicle fuel tank (e.g., fuel tank 144 shown in FIGS. 1 and 2) without additional measurements made by the fuel level sensor, such as described above with respect to FIG. 4. As such, method 500 may be performed as a part of method 400 of FIG. 4 (e.g., at 410) to establish a new high confidence fuel level measurement responsive to a refueling event. In other examples, method 500 may be performed responsive to any request for a high confidence fuel level measurement. For example, a controller (e.g., controller 12 of FIG. 2) may request the high confidence fuel level measurement after a threshold amount of fuel has been consumed as a rationality check for the inferred fuel level. The threshold amount of fuel refers to non-zero amount of fuel, such as 10 liters, in one example.

Method 500 begins at 502 and includes estimating and/or measuring operating conditions. Operating conditions may include, for example, fuel tank pressure, ambient temperature, a state of the engine, an ignition state of the vehicle, vehicle speed, vehicle location (as determined through an on-board GPS, for example), etc., such as described above at 402 of FIG. 4. Operating conditions may further include a tilt of the vehicle. The tilt of the vehicle may be measured by a tilt sensor, such as tilt sensor 198 shown in FIG. 1. The tilt of the vehicle may include a first tilt angle (e.g., in degrees) from a level position (0°) along a first axis of the vehicle and a second tilt angle from a level position along a second axis of the vehicle. As an example, the first axis may be a central axis through the length of the vehicle (e.g., from the front of the vehicle to the back of the vehicle), and the second axis may be a central axis through the width of the vehicle (e.g., from the left side of the vehicle to the right side of the vehicle).

At 504, method 500 includes determining if high confidence fuel level measurement conditions are met. The high confidence fuel level measurement conditions may include an indication that the vehicle is stationary to ensure that fuel slosh is not occurring. Fuel slosh refers to the fuel within the fuel tank splashing or otherwise dynamically moving, which may interfere with an accuracy of the fuel level measurement. For example, as the fuel sloshes in the fuel tank, a depth of the fuel where the fuel level sensor is positioned may change, resulting in a different fuel level measurement compared to when the fuel is still. If the vehicle is stationary, it may be assumed that the fuel tank is also stationary, and thus fuel slosh is not occurring. For example, it may be determined that the vehicle is stationary when the vehicle speed is zero. In some examples, the high confidence fuel level measurement conditions may be met if the vehicle speed is zero for at least a threshold duration. The threshold duration may be a non-zero amount of time over which the fuel in the fuel tank may settle since previous vehicle movement. As an example, the threshold duration may be a number of minutes or hours. Additionally or alternatively, it may be determined that the vehicle is stationary if the vehicle is off. As an example, the vehicle may be off for a least the threshold duration for the high confidence fuel level measurement conditions to be met. In some examples, while the vehicle is off, the controller may be put in a sleep mode, as described above with respect to FIG. 1. Therefore, a wake input, such as a vehicle unlock event or a door ajar signal, may transition the controller back to an awake mode, and the controller may then evaluate the high confidence fuel level measurement conditions. In some examples, the high confidence fuel level measurement conditions may further include vehicle tilt being less than a threshold angle along both the first axis and the second axis. As an example, the threshold angle may be in a range from 5-15°. However, in other examples, the vehicle tilt may not be an entry condition for the high confidence fuel level measurement.

If the high confidence fuel level measurement conditions are not met, such as the when the vehicle is not stationary (or the vehicle is stationary for less than the threshold duration), method 500 proceeds to 506 and includes inferring the fuel level based on an amount of fuel added and/or consumed since the previous high confidence fuel level measurement. For example, if method 500 is performed responsive to a refueling event, the controller may estimate the amount of fuel added to the fuel tank (as described above at 408 of FIG. 4), add the estimated amount to the previous high confidence fuel level measurement, and subtract an amount fuel consumed since the previous high confidence fuel level measurement (e.g., as described above at 416 of FIG. 4). If method 500 is not performed responsive to a refueling event, the controller may subtract the amount of fuel consumed since the previous high confidence fuel level measurement from the previous high confidence fuel level measurement to infer the fuel level.

At 508, method 500 includes continuing to monitor the high confidence fuel level measurement conditions. Method 500 may then return to 504 so that the high confidence fuel level measurement may be performed responsive to conditions being met.

If the high confidence fuel level measurement conditions are met, method 500 proceeds to 510 and includes transiently powering the fuel level sensor to measure the fuel level via the fuel level sensor. Measuring the fuel level via the fuel level sensor may include supplying electrical power to the fuel level sensor, such as via a vehicle battery (e.g., energy storage device 150 shown in FIG. 1), and measuring the resistance of the sensor (e.g., of electrical circuit 300 shown in FIG. 3). Transiently powering the fuel level sensor may include providing a pulse of non-zero voltage to the fuel level sensor, the pulse having a pre-determined duration during which the resistance of the sensor is measured, and then providing zero voltage to the sensor (e.g., unpowering the fuel level sensor). The controller may relate the measured resistance to the fuel level using a predetermined look-up table, function, or map. In some examples, the controller may also convert the fuel level into a fuel amount (e.g., volume) via a predetermined look-up table, function, or map. Thus, the output of the fuel level sensor may be used to obtain a single high confidence fuel level measurement, which may be displayed to a vehicle operator via an instrument panel, for example.

In some examples, instead of obtaining a single high confidence fuel level measurement, the controller may obtain a series of fuel level measurements, which may be averaged to determine the high confidence fuel level measurement. As one example, the fuel level sensor may be supplied with a series of voltage pulses, each voltage pulse having a pulse duration and an interval between each pulse during which no voltage (e.g., 0 V) is supplied, to obtain the series of fuel level measurements. A number of fuel level measurements obtained during the series may be in a range from 3 to 5, for example, and the series may be obtained over a short time duration (e.g., 30 seconds or less). Furthermore, if a coefficient of variation of the series of fuel level measurements is above a threshold variation, the high confidence fuel level measurement value may be rejected and remeasured, such as by repeating method 500. As an example, the threshold variation may be in a range from 0.5 to 1%, as repeated measurements during the short time duration are expected to be substantially identical when the vehicle is stationary.

Measuring the fuel level via the fuel level sensor at 510 may optionally include compensating the fuel level measurement for vehicle tilt, as indicated at 512. Vehicle tilt may result in the fuel being unevenly distributed throughout the fuel tank (e.g., due to gravity). Therefore, the fuel level sensor may output an increased or a decreased fuel level measurement depending on the tilt angle and a position of the fuel level sensor within the fuel tank. The controller may input the fuel level measurement and at least one of the first tilt angle and the second tilt angle into one or more look-up tables, functions, or maps and output a corrected fuel level measurement. The one or more look-up tables, functions, or maps may include pre-determined relationships between the fuel level measurement output by the fuel level sensor, the vehicle tilt, and the actual fuel level (e.g., as measured when the fuel tank is level) and may be stored in non-transitory memory. In this way, the controller may compensate for the effect of vehicle tilt on the fuel level measurement to increase the accuracy of the high confidence fuel level measurement. Following 510, method 500 ends. Together, the methods of FIGS. 4 and 5 may provide a method for determining a fuel level sensor measurement condition, and in response thereto, electrically powering the fuel level sensor to measure a fuel tank level; and determining a fuel level inference condition (which may be not the fuel level sensor measurement condition), and in response thereto, maintaining the fuel level sensor unpowered and inferring the fuel tank level. In some examples, electrically powering the fuel level sensor to measure the fuel tank level occurs while or during the fuel level sensor measurement condition, and inferring the fuel tank level occurs while fuel level sensor measurement condition is not present and/or while or during the fuel level inference condition. Further, instructions stored in memory may include determining the fuel level measurement condition based on an output of a refueling button, an output of a vehicle speed sensor, an output of a vehicle tilt sensor, and/or the fuel tank level, and in response, measuring the fuel tank level by instructions for sending a signal to the fuel level sensor. Additional instructions stored in memory may include determining the fuel level inference condition based on the output of the vehicle speed sensor, the vehicle tilt sensor, and/or the fuel tank level, and in response, inferring the fuel tank level by instructions for estimating an amount of fuel consumed based on command signals sent to fuel injectors. In some examples, the method may include determining whether to perform one or more of each of powering the fuel level sensor to measure the fuel tank level and inferring the fuel tank level based on a determination of whether fuel level sensor measurement condition is present and a determination of whether the fuel level inference condition is present.

In this way, the fuel level sensor may be used to measure the fuel tank fuel level only after a refueling event or when the fuel level is very low but not equal to an empty fuel level (below a non-zero threshold and greater than zero) and may remain unpowered (not pulsed and not powered) when not performing a measurement. As a result, electrical power consumption may be reduced, increasing vehicle fuel economy. Furthermore, when measuring the fuel level after a refueling event, the fuel level measurement may be performed during conditions when an accuracy of the fuel level sensor is optimal. Further still, an accurate fuel level may be displayed to a vehicle operator by inferring the fuel tank fuel level between measurements by the fuel level sensor based on a most recent fuel tank fuel level measurement and an amount of fuel added and/or consumed since the most recent fuel tank fuel level measurement.

Figure 6:
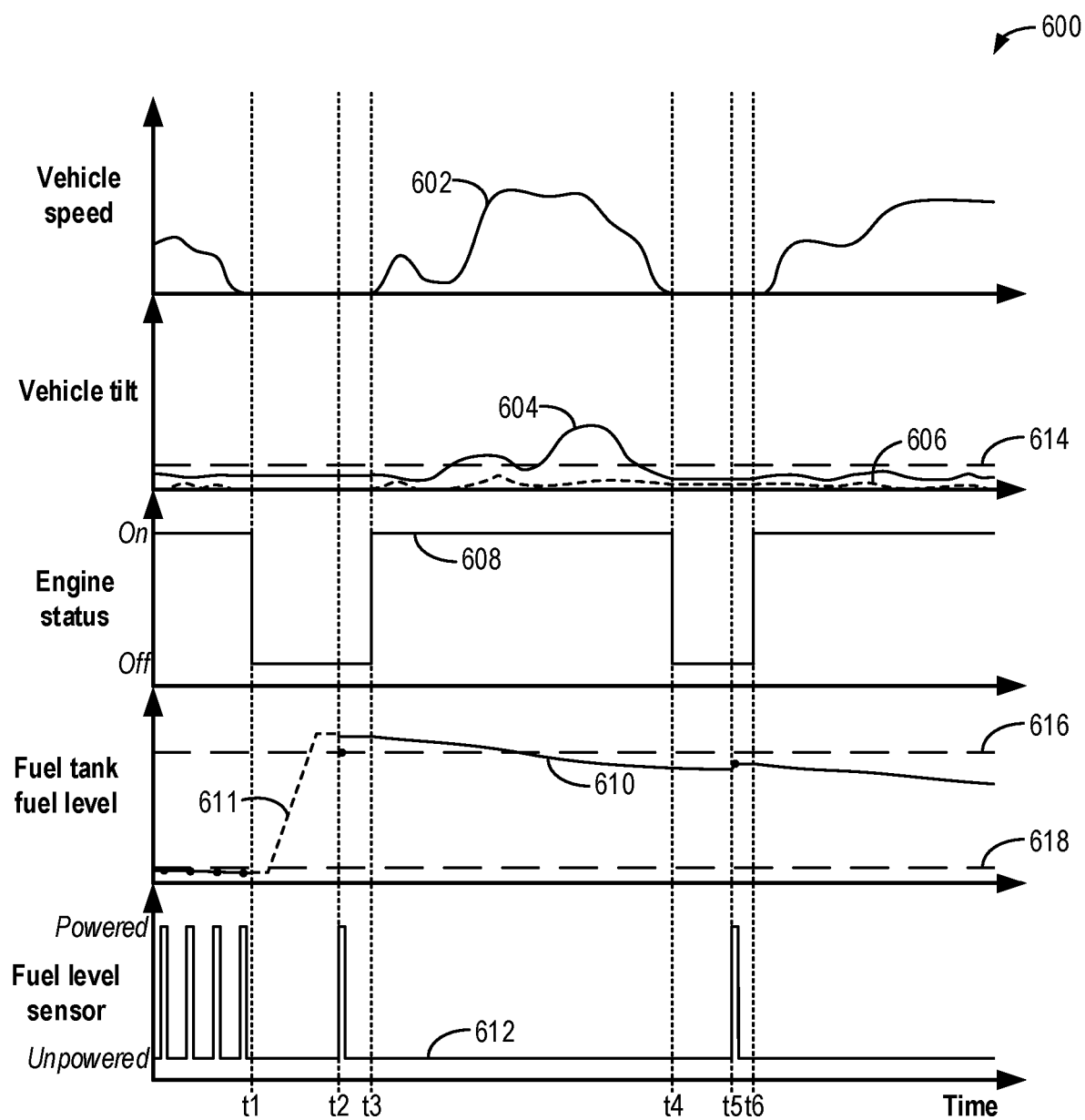
FIG. 6 depicts a prophetic example timeline of determining a fuel level in a fuel tank over a range of operating conditions.

Next, FIG. 6 shows an example timeline 600 of determining a fuel level in a fuel tank of a vehicle, such as vehicle system 100 shown in FIGS. 1 and 2. For example, a controller (e.g., controller 12 shown in FIG. 2) may measure the fuel level via a fuel level sensor (e.g., fuel level sensor 282 of FIG. 2) in response to a refueling event and while conditions for a high accuracy fuel level measurement are met, such as according to the example methods of FIGS. 4 and 5. As another example, the controller may measure the fuel level via the fuel level sensor when the fuel level is low. When the fuel level sensor is not used to measure the fuel level, the fuel level may be inferred based on the previous (e.g., most recent) fuel level measurement (e.g., via outputs of the fuel level sensor) and an amount of fuel added to the fuel tank and/or consumed since the previous fuel level measurement, as also described above with respect to FIGS. 4 and 5.

Vehicle speed is shown in plot 602, vehicle tilt along a first axis is shown in plot 604, vehicle tilt along a second axis is shown in dashed plot 606, engine status is shown in plot 608, fuel tank fuel level is shown in plot 610, and powering of the fuel level sensor is shown in plot 612. For all of the above, the horizontal axis represents time, with time increasing along the horizontal axis from left to right. The vertical axis represents each labeled parameter. For plots 602, 604, 606, and 610, a value of the labeled parameter increases along the vertical axis from bottom to top. For plot 608, the vertical axis represents whether the engine is "on" (in which combustion is occurring in engine cylinders) or "off" (in which combustion is not occurring within the engine cylinders), as labeled. For plot 612, the vertical axis represents whether the fuel level sensor is "powered," with non-zero voltage supplied to an electric circuit of the fuel level sensor, or "unpowered," with zero voltage supplied to the electric circuit, as labeled. Furthermore, a vehicle tilt threshold is represented by dashed line 614, a full tank fuel level is represented by dashed line 616, and a threshold fuel level is represented by dashed line 618. In the example of FIG. 6, the vehicle tilt is compared to the vehicle tilt threshold 614 to determine if entry conditions for performing a high accuracy fuel level measurement are met. However, in other examples, the vehicle tilt threshold 614 may not be used as an entry condition, and the fuel level measurement made by the fuel level sensor may be adjusted based on the vehicle tilt, as described above with respect to FIG. 5.

Prior to time t1, the engine is on (plot 608), and the vehicle is operating at a non-zero speed (plot 602). The fuel tank fuel level (plot 610), which may be measured and/or inferred, is less than the threshold fuel level (dashed line 618) and greater than an empty fuel level (e.g., a fuel level reading of zero). In response to the fuel tank fuel level being non-zero and less than the threshold fuel level, the fuel level is measured by the fuel level sensor. In the example shown in FIG. 6, the fuel level sensor is operated in a pulsed mode in which the sensor is powered with a series of voltage pulses, each voltage pulse having a pulse duration and an interval between each pulse during which no voltage is supplied and the sensor is unpowered, as shown in plot 612. However, note that in other examples, the fuel level sensor may be continuously supplied with non-zero voltage for an entirety of the measurement period (or duration). During each voltage pulse, a fuel level measurement is made by measuring a resistance of the fuel level sensor (e.g., a resistance of the electrical circuit). Each discreet fuel level measurement made by the fuel level sensor is shown by a filled circle. Furthermore, the fuel level measurement may be adjusted based on the vehicle tilt along the first axis (plot 604) and the vehicle tilt along the second axis (plot 606), as described above with respect to FIG. 4. Between each discreet measurement, the fuel level may be inferred based on the previous fuel level measurement and the amount of fuel consumed since the previous fuel level measurement. The amount of fuel consumed may be estimated based on engine operating conditions, such as fuel injection parameters, as described with respect to FIG. 4.

At time t1, the vehicle speed (plot 602) reaches zero, and the engine is turned off (plot 608). Specifically, at time t1, the vehicle is turned off for a refueling event, which is indicated via depression of a refueling button (e.g., refueling button 197 shown in FIG. 1). During the refueling event, the fuel tank fuel level increases as fuel is added to the fuel tank via a dispensing device (e.g., dispensing device 170 of FIG. 1), as indicated by dashed segment 611. However, the actual fuel level may not be measured during the refueling event. Instead, the amount of fuel delivered during the refueling event and/or a refueling rate may be wirelessly communicated to the controller by the dispensing device.

After completion of the refueling event, which may be indicated by closing of a fuel door, for example, it is determined if conditions for a high accuracy fuel level measurement are met at time t2. The vehicle speed is zero (plot 602), as the vehicle remains off, the vehicle tilt along the first axis (plot 604) is less than the threshold tilt (dashed line 614), and the vehicle tilt along the second axis (plot 606) is less than the threshold tilt (dashed line 614). Therefore, the high accuracy fuel level measurement conditions are considered met at time t2. In response, the fuel level sensor is transiently powered with a voltage pulse (plot 612) to measure the post-refueling fuel level. Although one voltage pulse is shown in the example of FIG. 6, in other examples, a series of voltage pulses may be supplied to the fuel level sensor at time t2 to obtain a series of fuel level measurements, which may be averaged to determine the high confidence fuel level measurement. The measured fuel level is equal to the full tank fuel level (dashed line 616). Therefore, the controller recognizes that the fuel level may not be accurately determined via the fuel level sensor. Instead, the controller estimates the amount of fuel added based on a steady-state pressure of the fuel tank during the refueling event and/or the amount of fuel communicated by the dispensing device, as described with respect to FIG. 4, and adds the amount of fuel added during the refueling event to the fuel level prior to the refueling event (e.g., the fuel level at time t1). The resulting inferred fuel level, as shown in plot 610, is higher than the measured fuel level and slightly lower than the actual fuel level (dashed segment 611). Therefore, the resulting inferred fuel level serves as a higher accuracy approximation of the fuel tank fuel level than the fuel level measured by the fuel level sensor at time t2. Furthermore, the controller may determine a remeasurement delay corresponding to an amount of fuel to consume and/or a duration of engine operation before another high accuracy fuel level measurement is performed via the fuel level sensor, as further described with respect to FIG. 4.

At time t3, the engine is restarted (plot 608). Between time t3 and time t4, the vehicle is driven, resulting in non-zero vehicle speeds (plot 602). The vehicle tilt varies in along both the first axis (plot 604) and the second axis (plot 606) due to a gradient of the road changing as the vehicle is driven. As the engine is operated to propel the vehicle, fuel is consumed, and the fuel tank fuel level decreases (plot 610). The fuel tank fuel level is an inferred value based on the fuel level prior to the refueling event (e.g., the fuel level at time t1), the amount of fuel added during the refueling event, and the amount of fuel consumed since the refueling event.

Between time t3 and time t4, the inferred fuel tank fuel level (plot 610) decreases below the full tank fuel level (dashed line 616). Even if the remeasurement delay has elapsed, conditions for measuring the fuel tank level via the fuel tank level sensor are not met, as the vehicle is operating at a non-zero speed. Furthermore, the inferred fuel tank fuel level is greater than the threshold fuel level (dashed line 618). As a result, the fuel level sensor remains unpowered (plot 612), which includes not being pulsed, and is not used to measure the fuel tank fuel level.

At time t4, the vehicle is parked. With the vehicle parked, the vehicle speed is zero (plot 602), and the engine is turned off (plot 608). The controller monitors for conditions for the high confidence fuel level conditions to be met, such as by the vehicle speed being zero for at least a threshold duration. Furthermore, the vehicle tilt along the first axis (plot 604) and the second axis (plot 606) is less than the threshold tilt (dashed line 614). In response to the threshold duration elapsing, at time t5, the fuel level sensor is transiently powered with a voltage pulse (plot 612) to obtain a high accuracy fuel level measurement. Because the measured fuel tank level is less than the full tank fuel level (dashed line 616), the measured fuel tank level is accepted and stored in a memory of the controller. As shown in plot 610, the fuel tank level increases relative to the inferred fuel level prior to the measurement (e.g., just before time t5), resulting in a higher accuracy fuel level value from which the fuel level can be subsequently inferred. Following the high accuracy fuel level measurement, the fuel level sensor is unpowered (plot 612).

At time t6, the engine is restarted (plot 608). As the engine consumes fuel to propel the vehicle at a non-zero speed after time t6 (plot 602), the fuel level sensor remains unpowered (plot 612). Instead of measuring the fuel level via the fuel level sensor, the fuel level is again inferred based on the high accuracy fuel level measurement performed at time t5 and the amount of fuel consumed since the high accuracy fuel level measurement was obtained.

In this way, an amount of electrical power consumed by the fuel level sensor, and thereby by the vehicle, is reduced. As a result, vehicle fuel economy is increased, which results in reduced costs for both the vehicle manufacturer and the vehicle operator. Furthermore, by measuring the fuel level with the fuel level sensor when conditions are optimal, such as when fuel slosh is not occurring and the fuel tank is not titled, an accuracy of the measurements made by the fuel level sensor is increased. By obtaining a high accuracy fuel level measurement, an accuracy of the fuel level inferred using a model and the previous high accuracy fuel level measurement is also increased, resulting in a more accurate fuel level being displayed to the vehicle operator. Further still, by measuring the fuel level via the fuel level sensor in response to the inferred fuel level decreasing below a threshold and inferring the fuel level when the fuel level sensor becomes saturated and reads an empty fuel level, inadvertent fuel tank emptying may be avoided.

The technical effect of transiently powering a fuel level sensor in a vehicle fuel tank is that electrical power consumption is reduced, thereby increasing vehicle fuel economy.

As one example, a method comprises: transiently powering a fuel level sensor responsive to a fuel tank refilling event; maintaining the fuel level sensor unpowered after the transiently powering; and, while the fuel level sensor is unpowered, inferring a fuel tank fuel level based on an output of the fuel level sensor during the transiently powering and an amount of fuel consumed during the maintaining the fuel level sensor unpowered. In the preceding example, additionally or optionally, the fuel tank supplies fuel to an engine, and the amount of fuel consumed is determined based on one or more fuel injection parameters. In any or all of the preceding examples, additionally or optionally, the transiently powering the fuel level sensor includes supplying a pulse of non-zero voltage to the fuel level sensor for a pulse duration, and wherein the output of the fuel level sensor is a resistance of the sensor, the resistance corresponding to the fuel tank fuel level. In any or all of the preceding examples, the transiently powering is further responsive to at least one of an indication that the fuel tank is stationary and an indication that the fuel tank is not tilted. In any or all of the preceding examples, additionally or optionally, the inferring the fuel tank fuel level based on the output of the fuel level sensor during the transiently powering and the amount of fuel consumed during the maintaining the fuel level sensor unpowered includes subtracting the amount of fuel consumed from an amount of fuel determined from the output of the fuel level sensor. In any or all of the preceding examples, additionally or optionally, the inferring the fuel tank fuel level is responsive to at least one of a completion of the transiently powering, an indication that the fuel tank is not stationary, an indication that the fuel tank is tilted, and the fuel tank fuel level remaining at or above a threshold. In any or all of the preceding examples, the method additionally or optionally further comprises, responsive to the fuel tank fuel level decreasing below the threshold, repowering the fuel level sensor, determining the fuel tank level based on an output of the fuel level sensor during repowering of the fuel level sensor, and displaying the determined fuel tank fuel level to a vehicle operator. In any or all of the preceding examples, additionally or optionally, repowering the fuel level sensor includes supplying pulses of non-zero voltage to the fuel level sensor, with an interval of zero voltage between each of the pulses of non-zero voltage. In any or all of the preceding examples, additionally or optionally, an output of the fuel level sensor during the transiently powering is adjusted based on a tilt of the fuel tank measured via a tilt sensor.

In another example, a method comprises: recording a first fuel level measurement of a fuel tank based on output of a fuel level sensor at a first time; in response to the first fuel level measurement being less than a full fuel level, inferring a fuel level of the fuel tank based on the first fuel level measurement without additional output from the fuel level sensor until the inferred fuel level is less than a threshold; and in response to the first fuel level indicating the full fuel level, recording a second fuel level measurement of the fuel tank based on output of the fuel level sensor at a second time; and inferring the fuel level based on the second fuel level measurement and not the first fuel level measurement and without additional output from the fuel level sensor until the inferred fuel level is less than the threshold. In the preceding example, additionally or optionally, recording each of the first fuel level measurement and the second fuel level measurement includes powering the fuel level sensor, measuring a resistance of the fuel level sensor, and then unpowering the fuel level sensor, and wherein the inferring the fuel level is further based on engine operating conditions, including one or more fuel injection parameters. In any or all of the preceding examples, the method additionally or optionally further comprises, responsive to the inferred fuel level decreasing below the threshold, measuring the fuel level via the fuel level sensor; and responsive to an empty fuel level measurement made by the fuel level sensor, inferring the fuel level based on a last fuel level measurement recorded prior to the empty fuel level measurement and without additional output from the fuel level sensor. In any or all of the preceding examples, additionally or optionally, recording the first fuel level measurement at the first time is responsive to a refueling event and an indication that the fuel tank is stationary, and recording the second fuel level measurement at the second time is responsive the indication that the fuel tank is stationary. In any or all of the preceding examples, additionally or optionally, the second time is determined based on an amount of fuel added to the fuel tank during the refueling event and the fuel level prior to the refueling event. In any or all of the preceding examples, additionally or optionally, wherein the amount of fuel added to the fuel tank is determined based on a measured steady-state pressure of the fuel tank during the refueling event or based on a value communicated by a fuel dispensing device.

In another example, a system for a vehicle comprises: a fuel tank configured to store and receive liquid fuel; a fuel level sensor disposed within the fuel tank; and a controller storing executable instructions in non-transitory memory that, when executed, cause the controller to: selectively supply power to the fuel level sensor responsive to conditions for obtaining a liquid fuel level measurement being met; and maintain the fuel level sensor unpowered and infer a level of the liquid fuel within the fuel tank responsive to the conditions for obtaining the liquid fuel level measurement not being met. In the preceding example, additionally or optionally, the fuel level sensor includes a float and a variable resistor, a resistance of the variable resistor corresponding to the level of the liquid fuel within the fuel tank, and the conditions for obtaining the liquid fuel level measurement include an indication that the vehicle is stationary. In any or all of the preceding examples, the system additionally or optionally further comprises a tilt sensor configured to measure vehicle tilt, and wherein the conditions for obtaining the liquid fuel level measurement further include the vehicle tilt being less than a threshold angle. In any or all of the preceding examples, additionally or optionally, the conditions for obtaining the liquid fuel level measurement include a non-zero, less than threshold level of the liquid fuel. In any or all of the preceding examples, additionally or optionally, the instructions that cause the controller to infer the level of the liquid fuel include further instructions stored in non-transitory memory that, when executed, cause the controller to: add an amount of liquid fuel received by the fuel tank after a most recent liquid fuel level measurement made by the fuel level sensor to the most recent liquid fuel level measurement and subtract an amount of liquid fuel consumed after the most recent liquid fuel level measurement from the most recent liquid fuel level measurement to estimate a current liquid fuel level; and display the current liquid fuel level on an instrument panel of the vehicle.

In another representation, a method comprises: transiently powering a fuel level sensor disposed within a fuel tank to obtain a single measurement of a fuel level in the fuel tank responsive to a refueling event; inferring the fuel level and maintaining the fuel level sensor unpowered after the transiently powering and while the fuel level remains above a threshold; and intermittently powering the fuel level sensor to obtain intermittent measurements of the fuel level in response to the fuel level decreasing below the threshold. In the preceding example, additionally or optionally, transiently powering the fuel level sensor includes supplying electrical power for a first duration, measuring a resistance of the fuel level sensor during the first duration, and then unpowering the fuel level sensor for a second duration after the first duration elapses. In any or all of the preceding examples, additionally or optionally, the second duration is greater than the first duration. In any or all of the preceding examples, additionally or optionally, intermittently powering the fuel level sensor includes supplying pulses of non-zero voltage, each of the pulses of non-zero voltage having a pulse duration and an interval between each pulse. In any or all of the preceding examples, additionally or optionally, the pulse duration is equal to the first duration. In any or all of the preceding examples, additionally or optionally, the interval between each pulse lasts for a third duration, the third duration greater than the first duration and less than the second duration. In any or all of the preceding examples, additionally or optionally, inferring the fuel level and maintaining the fuel lever unpowered includes inferring the fuel level based on the single measurement an amount of fuel added to the fuel tank and/or consumed since the transiently powering.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, "the term approximately is construed to mean plus or minus five percent of the range unless otherwise specified".

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   recording a first fuel level measurement of a fuel tank based on output of a fuel level sensor at a first time;
   in response to the first fuel level measurement being less than a full fuel level, inferring a fuel level of the fuel tank based on the first fuel level measurement without additional output from the fuel level sensor until the inferred fuel level is less than a threshold; and
   in response to the first fuel level measurement indicating the full fuel level,
     recording a second fuel level measurement of the fuel tank based on the output of the fuel level sensor at a second time, the second time determined based on an amount of fuel added to the fuel tank during a refueling event and a most recent fuel level recorded prior to the refueling event; and
     inferring the fuel level based on the second fuel level measurement and not the first fuel level measurement and without additional output from the fuel level sensor until the inferred fuel level is less than the threshold.

2. The method of claim 1, wherein recording each of the first fuel level measurement and the second fuel level measurement includes powering the fuel level sensor, measuring a resistance of the fuel level sensor, and then unpowering the fuel level sensor, and wherein the inferring the fuel level is further based on engine operating conditions, including one or more fuel injection parameters.

3. The method of claim 1, further comprising:
responsive to the inferred fuel level decreasing below the threshold, measuring the fuel level via the fuel level sensor; and
responsive to an empty fuel level measurement made by the fuel level sensor, inferring the fuel level based on a last fuel level measurement recorded prior to the empty fuel level measurement and without additional output from the fuel level sensor.

4. The method of claim 1, wherein recording the first fuel level measurement at the first time is responsive to a refueling event and an indication that the fuel tank is stationary, and recording the second fuel level measurement at the second time is responsive to the indication that the fuel tank is stationary.

5. The method of claim 1, wherein the amount of fuel added to the fuel tank is determined based on a measured steady-state pressure of the fuel tank during the refueling event or based on a value communicated by a fuel dispensing device.

6. A method, comprising:
following a refueling event, recording a first fuel level measurement of a fuel tank based on output of a fuel level sensor at a first time;
in response to the first fuel level measurement being less than a full fuel level, inferring a fuel level of the fuel tank based on the first fuel level measurement without additional output from the fuel level sensor until the inferred fuel level is less than a threshold; and
in response to the first fuel level measurement indicating the full fuel level,
determining a remeasurement delay based on an amount of fuel added to the fuel tank during the refueling event and a most recent fuel level recorded prior to the refueling event;
recording a second fuel level measurement of the fuel tank based on the output of the fuel level sensor at a second time that is after the remeasurement delay; and
inferring the fuel level based on the second fuel level measurement and not the first fuel level measurement and without additional output from the fuel level sensor until the inferred fuel level is less than the threshold.

7. The method of claim 6, wherein the most recent fuel level recorded prior to the refueling event is a measured or inferred fuel level value stored in a memory.

8. The method of claim 6, wherein recording the first fuel level measurement at the first time is responsive to a refueling event and an indication that the fuel tank is stationary, and recording the second fuel level measurement at the second time is responsive to the indication that the fuel tank is stationary after the remeasurement delay has elapsed.

9. The method of claim 6, wherein the remeasurement delay is one of an amount of fuel to be consumed and a time duration.

* * * * *